United States Patent Office 3,484,460
Patented Dec. 16, 1969

3,484,460
N-ACYLOXYALKYL DERIVATIVES OF 2-ARYL-4,8-DIAMINO-1,5-DIHYDROXYANTHRAQUINONES
Jean-Frederic Guye-Vuilleme, Basel, Switzerland, assignor to Ciba Limited, Basel, Switzerland, a Swiss company
No Drawing. Filed Sept. 14, 1965, Ser. No. 487,322
Claims priority, application Switzerland, Sept. 22, 1964, 12,293/64; Aug. 12, 1965, 11,358/65
Int. Cl. C09b *1/50;* D06p *1/20*
U.S. Cl. 260—376   4 Claims

ABSTRACT OF THE DISCLOSURE

Water-insoluble anthraquinone dyestuffs of formula

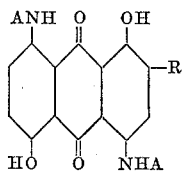

in which one A represents a hydroxyalkyl or acyloxyalkyl group, the other A a hydroxyalkyl or acyloxyalkyl group or preferably a hydrogen atom and R an aryl radical which has at least one hydroxyl, alkoxy, phenoxy or acyloxy group in the o- or p-position relative to the anthraquinonyl radical possess excellent affinity for polyester fibers, particularly for polyethylene terephthalate fibers, and dye these pure blue to greenish blue shades having excellent fastness to light and sublimation.

---

This invention is based on the observation that valuable water-insoluble anthraquinone dyestuffs of formula

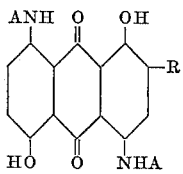

in which one A represents a hydroxyalkyl or acyloxyalkyl group, the other A a hydroxyalkyl or acyloxyalkyl group or preferably a hydrogen atom and R an aryl radical which has at least one hydroxyl, alkoxy, phenoxy or acyloxy group in the o- or p-position relative to the anthraquinonyl radical can be obtained by treating a dihydroxydiaminoanthraquinone of formula

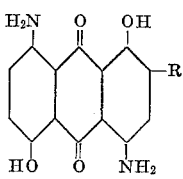

in which R has the significance indicated, with a hydroxyalkylating agent and if desired treating the hydroxyalkylated product obtained with an acylating agent.

In the dihydroxydiaminoanthraquinones to be used as starting materials, the aryl radical R preferably denotes an at most bicyclic aryl radical, for example a naphthalene radical, but particularly a benzene radical which apart from the substituents referred to may in all cases additionally contain halogen atoms or alkyl groups, or further hydroxyl or alkoxy groups. The following may be named as examples:

1,5-dihydroxy-4,8-diamino-2-(4'-hydroxyphenyl)-anthraquinone,
1,5-dihydroxy-4,8-diamino-2-(4'-hydroxy-3'-chlorophenyl)-anthraquinone,
1,5-dihydroxy-4,8-diamino-2-(4'-methoxyphenyl)-anthraquinone,
1,5-dihydroxy-4,8-diamino-2,(4'-hydroxy-3'-methylphenyl)-anthraquinone,
1,5-dihydroxy-4,8-diamino-2-(4'-hydroxy-2'-methylphenyl)-anthraquinone,
1,5-dihydroxy-4,8-diamino-2-(2'-hydroxy-5'-methylphenyl)-anthraquinone,
1,5-dihydroxy-4,8-diamino-2-(2'-hydroxy-5'-ethylphenyl)-anthraquinone,
1,5-dihydroxy-4,8-diamino-2-(4'-hydroxy-3'-amylphenyl)-anthraquinone,
1,5-dihydroxy-4,8-diamino-1-(2'-hydroxy-5'-amylphenyl)-anthraquinone,
1,5-dihydroxy-4,8-diamino-2-(2'-hydroxy-5'-octylphenyl)-anthraquinone,
1,5-dihydroxy-4,8-diamino-2-(2'-hydroxy-5'-cyclohexyl-phenyl)-anthraquinone,
1,5-dihydroxy-4,8-diamino-2-(4'-hydroxy-3'-phenylphenyl)-anthraquinone,
1,5-dihydroxy-4,8-diamino-2-(2'-hydroxy-5'-phenylphenyl)-anthraquinone,
1,5-dihydroxy-4,8-diamino-2-(4'-hydroxy-3',5'-dimethylphenyl)-anthraquinone,
1,5-dihydroxy-4,8-diamino-2-(3',4'-dimethoxyphenyl)-anthraquinone,
1,5-dihydroxy-4,8-diamino-2-(2',5'-dimethoxyphenyl)-anthraquinone,
1,5-dihydroxy-4,8-diamino-2-(4'-benzyloxy)-phenyl-anthraquinone,
1,5-dihydroxy-4,8-diamino-2-(4'-hydroxy-3'-methoxyphenyl)-anthraquinone,
1,5-dihydroxy-4,8-diamino-2-(3',4'-dihydroxyphenyl)-anthraquinone,
1,5-dihydroxy-4,8-diamino-2-(2',4'-dihydroxyphenyl)-anthraquinone,
1,5-dihydroxy-4,8-diamino-2-(2',5'-dihydroxyphenyl)-anthraquinone,
1,5-dihydroxy-4,8-diamino-2-(2',4',6'-trihydroxyphenyl)-anthraquinone,
1,5-dihydroxy-4,8-diamino-2-(4'-phenoxyphenyl)-anthraquinone,
1,5-dihydroxy-4,8-diamino-2-(2'-hydroxynaphthyl-1')-anthraquinone,
1,5-dihydroxy-4,8-diamino-2-(4'-hydroxynaphthyl-1')-anthraquinone, Such compounds may be obtained by addition of hydroxy- or alkoxy-benzenes to the boric esters of 1,5-dihydroxy-4,8-diaminoanthraquinone - 2,6 - disulfonic acid dissolved in concentrated sulfuric acid as in German patent specification No. 445,269, followed by boiling the addition products in aqueous acid solution or warming in alkaline solution to 20–60° C. whereby one sulfonic acid group is eliminated as in German patent specification No. 446,563 and reductive elimination of the remaining sulfonic acid group.

The treatment of the 1,5-dihydroxy-4,8-diamino-2-arylanthraquinones with hydroxyalkylating agents is preferably carried out by heating with the chloroformic ester of the corresponding halogeno-alcohol, advantageously in the presence of an acid-binding agent, for example an alkali carbonate or an alkali acetate. Chloroformic esters of low aliphatic α, β or α,γ-halogeno-alcohols, for example of ethylene chlorohydrin, 1-chloro-2-hydroxypropane, 2-chloro-3-hydroxypropane, 1-chloro- 3-hydroxypropane, 1-chloro-2-hydroxybutane or 3-chloro-4-hydroxybutane are preferably used. It is advantageous to use 2–6 moles, preferably 3–5 moles, of the chloroformic ester per mole of the dihydroxyaminoanthraquinone. With this quantity ratio, an average of one hydroxyalkyl group is introduced.

The reaction of the dihydroxydiaminoanthraquinone with the chloroformic ester is carried out by the process described in Chemical Abstracts 51, 7018 (1957) in a high-boiling organic solvent, for example, chlorobenzene, nitrobenzene or pyridine. It is assumed that during this reaction at least one amino group of the dihydroxydiaminoanthraquinone reacts with the chloroformic chloroalkyl ester with the elimination of 2 moles of hydrogen halide to form a heterocyclic ring of formula

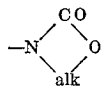

Heating the intermediate product so obtained with an aqueous alkali hydroxide solution hydrolyses the ring and the corresponding hydroxyalkylaminoanthraquinone is formed with elimination of carbon dioxide. The hydroxyalkylated dihydroxydiaminoanthraquinones so obtainable are valuable dyestuffs which dye polyester fibers pure blue shades having good fastness to light and sublimation.

Particularly valuable dyestuffs are obtained when the hydroxyalkylated dihydroxydiaminoanthraquinones are treated with acylating agents. The lower fatty acids may be mentioned as acylating agents, for example formic acid, acetic acid or propionic acid, but particularly the halides and anhydrides of aliphatic, cycloaliphatic or aromatic carboxylic acids. In the aliphatic carboxylic acid series the following should receive first consideration: the chlorides or anhydrides of monocarboxylic acids containing 1 to 6 carbon atoms, for example those of acetic acid, propionic acid, butyric acid, valeric acid, caproic acid or caprylic acid, or of unsaturated carboxylic acids, e.g. acrylic or crotonic acids or cinnamic acid, or of substituted aliphatic carboxylic acids, e.g. chloroacetic acid, γ-chlorobutyric acid, methoxyacetic acid, phenylacetic acid or cyanoacetic acid. In the cycloaliphatic carboxylic acid halide series the chloride of hexahydrobenzoic acid may be mentioned, and in the aromatic carboxylic acid halide series, benzoyl chloride and its substitution products. Finally, chlorocarbonic acid alkyl esters or phenylisocyanates may be used as acylating agents.

It is advantageous to use 1 to 3 moles, preferably about 2 moles, of the acylating agent per 1 mole of the dihydroxydiaminoanthraquinone, when the starting molecule contains a total of 3-hydroxyl groups. When a higher number of hydroxyl groups is present, a larger amount of the acylating reagent should be chosen. The reaction can be carried out by known methods, for example in an inert organic solvent e.g. acetone, nitrobenzene or chlorobenzene, or in a tertiary base e.g. pyridine or dimethylaniline, or in a mixture of one of the inert solvents quoted and a tertiary base. The reaction is advantageously carried out at medium temperatures.

The working up of the acylation products obtained is advantageously carried out by complete or partial removal of the solvent by direct distillation and dilution of the distillation radical with water, or by removal of the solvent by steam distillation. The precipitated dyestuff may be separated by filtration.

The new acylated products obtained according to the invention possess excellent affinity for polyester fibers, particularly for polyethylene terephthalate fibers, and dye these pure blue to greenish blue shades having excellent fastness to light and sublimation. The new dyestuffs moreover exhibit excellent cotton resist properties.

In dyeing, the new dyestuffs are advantageously used in a finely divided form and the dyeing is carried out with the addition of dispersing agents for example soap, sulfite cellulose waste lye or synthetic detergents, or a combination of various wetting and dispersing agents. It is generally advantageous to convert the dyestuff, before dyeing, into a dyestuff preparation which contains a dispersing agent and the finely divided dyestuff in such a form that a fine dispersion results on diluting the dyestuff preparation with water. Such dyestuff preparations may be obtained in known manner, e.g. by reprecipitation of the dyestuff from sulfuric acid and grinding the sludge so obtained with sulfite waste lye, or by grinding the dyestuff, in a dry or wet form, in high efficiency grinding equipment with or without the addition of dispersing agents during grinding.

Owing to their fastness to alkali the new dyestuffs are particularly suitable for dyeing by the so-called thermofixing process, in which the fabric to be dyed is impregnated with an aqueous dispersion of the dyestuff, which appropriately contains 1 to 50% of urea and a thickening agent, particularly sodium alginate, preferably at temperatures of at most 60° C. and squeezed in the usual way. It is advantageous to squeeze the impregnated goods in such a way that the dye liquid retained amounts to 50 to 100% of their initial weight. In order to fix the dyestuff, the fabric impregnated in this way is heated, e.g. in a stream of warm air, to temperatures above 100° C., for example between 180 and 220° C., preferably after previous drying.

The thermofixing process just mentioned is of particular interest for dyeing mixed fabrics of polyester fibers and cellulose fibers, particularly cotton. In this case the padding liquid contains, in addition to the dyestuffs of the invention, dyestuffs suitable for dyeing cotton, particularly vat dyestuffs, or reactive dyestuffs, i.e. dyestuffs which may be fixed on to cellulose fibers with the formation of a chemical bond, for example dyestuffs containing a chlorotriazine or chlorodiazine group. In the latter case it is advisable to add an acid-binding agent, for example an alkali carbonate, alkali phosphte, alkali borate or alkali perborate or mixtures of these, to the padding solution. When vat dyestuffs are used, it is necessary to treat the padded fabric, after the heat treatment, with an aqueous alkaline solution of a reducing agent generally used in vat dyeing.

It is advisable to submit the dyeings obtained to an after-treatment, for example by heating with an aqueous solution of a non-ionic detergent.

The dyestuffs may also be applied by printing instead of impregnating. For this purpose a printing paste for example is used which contains, in addition to the customary auxiliary agents for printing, e.g. wetting and thickening agents, the finely dispersed dyestuff, optionally mixed with one of the cotton dyestuffs referred to above, if desired in the presence of urea and/or of an acid-binding agent.

The following examples illustrate the invention, the parts and percentages being by weight unless otherwise stated and temperatures quoted in degrees centigrade.

EXAMPLE 1

10.9 parts of 1,5 - dihydroxy - 4,8 - diamino - 2-(4'-hydroxy)-phenylanthraquinone were dissolved in 200 parts by volume of nitrobenzene with stirring and boiling under reflux. After cooling to 100° C., 3.5 parts of anhydrous sodium carbonate and 5.15 parts of chloroethyl chloroformate were added dropwise. This mixture was then stirred for one hour at 100° C. and subsequently for 20 hours at 140 to 150° C. The whole mixture was then steam distilled, filtered and dried. The 14.9 parts obtained were dissolved in 680 parts by volume of 20% potassium hydroxide solution and warmed to 107 to 109° C. with stirring. After 4 hours the mixture was diluted with water and acidified. 10 parts of a bluish green dyestuff were obtained. It dyed polyethylene terephthalate fibers from an aqueous dispersion pure blue shades having good fastness to light and sublimation.

5 parts of the product as obtained in paragraph 1 were dissolved in 100 parts by volume of pyridine and 2.24 parts by volume of acetic anhydride were added dropwise with shaking. The mixture was boiled under reflux for 15 minutes, diluted with a little water, the pyridine distilled off with steam and the mixture filtered. The filter cake obtained was washed and dried. In this way 5.34 parts of a dyestuff powder were obtained which dyed polyester fibers blue shades. The dyeing was fast to light and sublimation and possessed good resist characteristics to wool and particularly to cotton.

Dyeing instruction 1 part of the dyestuff obtained as in paragraph 2 was ground wet with 2 parts of a 50% aqueous solution of sulfite cellulose waste layer and dried.

This dyestuff preparation was stirred with 40 parts of a 10% aqueous solution of a condensation product of octadecyl alcohol with 20 moles of ethylene oxide, and 4 parts of 40% acetic acid solution were added. 4,000 parts of a dye bath were prepared from this by dilution with water.

100 parts of a cleaned polyester fiber material were placed in this bath at 50° C., the temperature increased to 120–130° C. in half an hour and dyeing carried out for one hour at that temperature with the vessel closed. Thereafter the material was thoroughly rinsed. A pure blue dyeing having excellent fastness to light and sublimation was obtained.

EXAMPLE 2

6 parts of 1,5-dihydroxy-4,8-diamino-2-(4′-methoxy)-phenylanthraquinone were stirred into 60 parts by volume of pyridine. This mixture was boiled under reflux until completely dissolved and then cooled to room temperature. Thereafter 9.15 parts of chloroethyl chloroformate were added dropwise during 45 minutes when the solution assumed a red color. It was then heated to boiling under reflux for one hour and thereafter 300 parts by volume of 20% sodium hydroxide solution were added dropwise. The mixture was then stirred for a further 4 hours under reflux, the pyridine distilled off with steam, 200 parts of water added, the mixture boiled for a further 20 minutes and thereafter filtered hot. The product so obtained was washed on the filter and then dried. The yield was 6 parts. The dyestuff dyed polyethylene terephthalate fibers from aqueous dispersion, pure blue shades having good fastness to light and sublimation.

5 parts of the product obtained as in paragraph 1 were dissolved in 100 parts by volume of pyridine and 2.24 parts by volume of acetic anhydride were added dropwise with shaking. The mixture was boiled for 15 minutes under reflux, diluted with a little water, the pyridine distilled off in steam and the mixture filtered. The filter cake obtained was washed and dried. In this way 5.34 parts of a dyestuff powder were obtained which dyed polyester fibers blue shades. The dyeing was fast to light and sublimation and possessed good resist effects to wool and particularly to cotton.

The same product was obtained when the starting dyestuff was boiled in 100 parts by volume of glacial acetic acid.

When, in paragraph 1, the same amount of cholorpropyl chloroformate was used instead of chloroethyl chloroformate, a dyestuff having similar properties was obtained.

When in paragraph 1, 1,5-dihydroxy-4,8-diamino-2-(4′-ethoxy- or -4′-butoxy)-phenylanthraquinone is used instead of the 4′-methoxy compound, dyestuffs having similar properties are obtained.

EXAMPLE 3

5 parts of the product obtained as in Example 2, paragraph 1, were dissolved in 100 parts by volume of pyridine, 5.4 parts of benzoic anhydride were added with shaking, and the mixture thereafter boiled for 15 minutes under reflux. It was then diluted with a little water and the pyridine was separated by steam-distillation. The product was filtered, washed and dried. The yield was 5.2 parts. The dyestuff dyed polyester fibers blue shades.

EXAMPLE 4

20 parts of 1,5-dihydroxy-4,8-diamino-2-(4′-methoxy)-phenylanthraquinone were added a little at a time to 340 parts by volume of pyridine with stirring. 33.4 parts of β-chloroisopropyl chloroformate were added dropwise during 45 minutes to the solution so obtained the color changing from blue to red. Thereafter the mixture was heated to 110–115° C. and stirred for one hour at this temperature. It was allowed to cool to 50° C., 1.200 parts by volume of 20% caustic soda were added dropwise and the mixture thereafter boiled for 10 hours under reflux. It was then diluted with 1.200 parts by volume of water and the pyridine was separated by steam distillation. The mixture was then filtered and the filter cake washed with water containing a little dilute acetic acid and dried. 20 parts of a dyestuff were obtained which dyed polyester fibers greenish blue shades.

5 parts of the product obtained as in paragraph 1 were dissolved in 100 parts by volume of pyridine, 1.9 parts by volume of butyryl chloride were added dropwise with shaking, and the mixture boiled for 15 minutes under reflux. The charge was diluted with a little water, the pyridine steam-distilled, and the mixture filtered. The filter cake was washed and dried. 5 parts of a dyestuff were obtained which dyed polyester fibers greenish blue shades having excellent fastness to light and sublimation.

EXAMPLE 5

5 parts by weight of 1,5-dihydroxy-4,8-diamino-2-(4′-hydroxynaphthyl)-anthraquinone were introduced with stirring into 57.6 parts by volume of distilled pyridine. This mixture was boiled under reflux until completely dissolved and then cooled to room temperature. Thereafter 7.6 parts of chloroethyl chloroformate were added dropwise during 40 minutes, the solution assuming a red color. The mixture was then heated to boiling under reflux for 1.5 hours and thereafter 253 parts by volume of 20% caustic soda were added dropwise during 40 minutes at about 50° C. The mixture was then boiled for 10 hours under reflux, the color changing to bluish green. The pyridine was then steam-distilled and the product filtered, washed and dried. The yield was 3.2 parts. A further 3.1 parts of dyestuff were obtained by acidifying the mother liquor. The product gave greenish blue dyeings on polyester fibers, having good fastness to light and sublimation.

A similar dyestuff was obtained by reaction with acetic anhydride following the process of Example 1, paragraph 2.

EXAMPLE 6

4.8 parts of 1,5-dihydroxy-4,8-diamino-2-(4′-hydroxyphenyl)-anthraquinone in 82 parts by volume of pyridine were reacted as in Example 4 with 8 parts by weight of a mixture consisting of 80% of the compound of formula

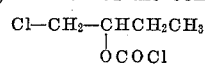

and 20% of the compound of formula

(obtained as in Example 2 of U.S. Patent No. 2,820,810 by passing phosgene into 1,2-butene oxide at 24–34° C.). The reaction product was hydrolysed with 288 parts by volume of 20% caustic soda as in Example 4. The dyestuff obtained dyed polyester fibers greenish blue shades having excellent fastness to light and sublimation.

Reaction with acetic anhydride by the process described in Example 1, paragraph 2, yielded a dyestuff which also dyed polyester fibers greenish blue shades having excellent fastness to sublimation and good fastness to light.

What is claimed is:

1. The dyestuff of the formula

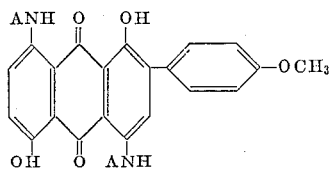

in which one A is hydrogen and the other A the group of the formula —CH$_2$CH$_2$OCOC$_6$H$_5$.

2. The dyestuff of the formula

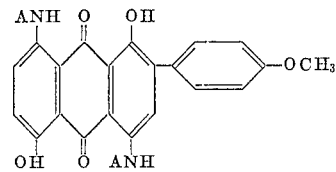

in which one A is hydrogen and the other A the group of the formula —CH$_2$CH$_2$OCOCH$_3$.

3. The dyestuff of the formula

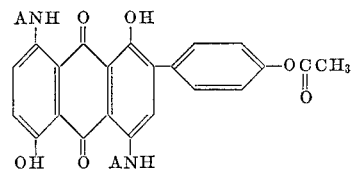

in which one A is hydrogen and the other A the group of of the formula —CH$_2$CH$_2$OCOCH$_3$.

4. The dyestuff of the formula

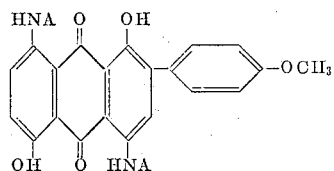

in which one A is hydrogen and the other A the group of of the formula —CH$_2$CH$_2$CH$_2$OCOCH$_3$.

References Cited

UNITED STATES PATENTS

| | | | |
|---|---|---|---|
| 2,319,043 | 5/1943 | Dickey et al. | 260—376 |
| 2,338,908 | 1/1944 | Dickey et al. | 260—376 |
| 1,336,690 | 7/1963 | Kuhlman | 260—380 |
| 1,352,732 | 1/1964 | Basf | 260—376 |
| 3,265,460 | 8/1966 | Hoare | 260—369 XR |

LORRAINE A. WEINBERGER, Primary Examiner

HAROLD C. WEGNER, Assistant Examiner

U.S. Cl. X.R.

8—39, 40; 260—379, 380